United States Patent
Fujii et al.

(10) Patent No.: US 11,632,381 B2
(45) Date of Patent: Apr. 18, 2023

(54) INFORMATION PROCESSING DEVICE, INFORMATION PROCESSING SYSTEM, AND RECORDING MEDIUM

(71) Applicant: Panasonic Intellectual Property Management Co., Ltd., Osaka (JP)

(72) Inventors: Takayuki Fujii, Osaka (JP); Toshihisa Nakano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 275 days.

(21) Appl. No.: 16/994,935

(22) Filed: Aug. 17, 2020

(65) Prior Publication Data
US 2021/0058413 A1    Feb. 25, 2021

(30) Foreign Application Priority Data

Aug. 23, 2019 (JP) .............................. JP2019-152453

(51) Int. Cl.
*H04L 9/40* (2022.01)
*H04L 12/40* (2006.01)

(52) U.S. Cl.
CPC .... *H04L 63/1416* (2013.01); *H04L 12/40013* (2013.01); *H04L 63/1425* (2013.01); *H04L 2012/40215* (2013.01); *H04L 2012/40273* (2013.01)

(58) Field of Classification Search
CPC ............. H04L 63/1416; H04L 63/1425; H04L 63/1466
USPC ......................................................... 726/23
See application file for complete search history.

(56) References Cited

U.S. PATENT DOCUMENTS

| | | | | |
|---|---|---|---|---|
| 9,398,043 B1* | 7/2016 | Yang | .................... | H04L 63/1441 |
| 11,075,930 B1* | 7/2021 | Xavier | ................ | H04L 63/1425 |
| 2006/0123479 A1* | 6/2006 | Kumar | ................ | H04L 63/0245 726/23 |
| 2008/0141372 A1* | 6/2008 | Massey | ................. | H04L 63/123 726/23 |
| 2012/0254999 A1* | 10/2012 | Sallam | .................. | G06F 21/566 726/23 |
| 2016/0352765 A1* | 12/2016 | Mermoud | ........... | H04L 63/1458 |
| 2018/0351980 A1* | 12/2018 | Galula | ................ | H04L 63/1416 |

(Continued)

FOREIGN PATENT DOCUMENTS

JP    2003-218869    7/2003

OTHER PUBLICATIONS

Murvay et al., "Security Shortcomings and Countermeasures for the SAE J1939 Commercial Vehicle Bus Protocol", IEEE Transactions on Vehicular Technology, vol. 67, No. 5, May 2018, pp. 4325-4339.

(Continued)

*Primary Examiner* — Badri Narayanan Champakesan
(74) *Attorney, Agent, or Firm* — Greenblum & Bernstein, P.L.C.

(57) ABSTRACT

An information processing device includes a malicious message detector and an outputter. The malicious message detector detects a malicious message in a network based on an SA included in a claim message received from the network, a period that is based on a time at which the claim message is received, and a message received from the network before or after the claim message. The outputter outputs a detection result of the malicious message detector.

13 Claims, 12 Drawing Sheets

(56) References Cited

U.S. PATENT DOCUMENTS

| | | | |
|---|---|---|---|
| 2018/0375879 A1* | 12/2018 | Carlesimo | H04L 63/1425 |
| 2019/0052654 A1* | 2/2019 | Juliato | H04L 63/1416 |
| 2020/0389469 A1* | 12/2020 | Litichever | H04L 63/029 |
| 2021/0105299 A1* | 4/2021 | Ma | H04L 63/168 |

OTHER PUBLICATIONS

Japan Office Action issued in Japan Patent Application No. 2019-152453, dated Feb. 7, 2023, together with English translation thereof.

\* cited by examiner

US 11,632,381 B2

INFORMATION PROCESSING DEVICE, INFORMATION PROCESSING SYSTEM, AND RECORDING MEDIUM

CROSS REFERENCE TO RELATED APPLICATION

The present application is based on and claims priority of Japanese Patent Application No. 2019-152453 filed on Aug. 23, 2019.

BACKGROUND

1. Technical Field

The present disclosure relates to an information processing device, an information processing system, and a recording medium for detecting a malicious message in a network in which a plurality of electronic control units (hereinafter, abbreviated to ECUs) are connected.

2. Description of the Related Art

The Society of Automotive Engineers (SAE) J1939 standard serves as a control bus standard applied to trucks, busses, construction machines, tractors, trailers, ships, or the like. In these moving bodies, ECUs transmit and receive messages to and from each other based on the SAE J1939 standard, for example. The presence of an attack has been pointed out. Specifically, through malicious use of an address claim (hereinafter, abbreviated to ACL) massage used in the SAE J1939 standard, an ECU transmits a malicious message to a controller area network (CAN) in which ECUs are connected to spoof a valid ECU. In this respect, Pal-Stefan Murvay and Bogdan Groza, "Security Shortcomings and Countermeasures for the SAE J1939 Commercial Vehicle Bus Protocol," IEEE Transactions on Vehicular Technology, Volume 67, Issue 5, May 2018 discloses a technique for detecting a malicious message where an ACL message of the SAE J1939 standard is used maliciously. Specifically, public key encryption-based or private key encryption-based authentication and key sharing are performed between ECUs, and a code for detecting alteration (message authentication code (MAC)) is added to a CAN message packet through the shared key. Thus, a malicious message can be detected.

SUMMARY

However, the technique disclosed in Murvay and Groza, 2018 can be improved upon.

In view of this, the present disclosure provides an information processing device capable of improving upon the above related art.

In addressing the above, an information processing device according to one aspect of the present disclosure is an information processing device that detects a malicious message in a network in which a plurality of electronic control units are connected. The plurality of electronic control units are each a device that transmits, to the network, a claim message claiming a source address that the device desires to use in the network and then starts transmitting a normal message that includes the source address to the network. The information processing device includes a malicious message detector and an outputter. The malicious message detector detects a malicious message in the network based on a source address included in a claim message received from the network, a period that is based on a time at which the claim message is received, and a message received from the network before or after the claim message. The outputter outputs a detection result of the malicious message detector.

In addition, in addressing the above, an information processing system according to one aspect of the present disclosure includes the above information processing device, the above plurality of electronic control units, and the above network.

Furthermore, in addressing the above, a recording medium according to one aspect of the present disclosure is a non-transitory computer-readable recording medium having a program recorded thereon. The program is to be executed by an information processing device that detects a malicious message in a network in which a plurality of electronic control units are connected. The plurality of electronic control units are each a device that transmits, to the network, a claim message claiming a source address that the device desires to use in the network and then starts transmitting a normal message that includes the source address to the network. The program includes: detecting a malicious message in the network based on a source address included in a claim message received from the network, a period that is based on a time at which the claim message is received, and a message received from the network before or after the claim message; and outputting a result of the detecting.

The information processing device according to one aspect of the present disclosure can improve upon the above related art.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Embodiment

The technique disclosed in Murvay and Groza, 2018 requires communication for authentication and key sharing. This leads to a problem in that this communication causes a delay each time when CAN communication starts. In addition, a field of as large as 8 bites is required within a CAN message packet for storing a MAC, and the amount of data that can be transmitted with a single CAN message is reduced. This disadvantageously increases the time it takes to transmit a message. In this manner, detecting a malicious message in a network, such as a CAN, with the technique disclosed in Murvay and Groza, 2018 may cause the communication quality to deteriorate.

Accordingly, an information processing device and so on that can detect a malicious message in a network while keeping the communication quality from deteriorating will be described below.

Configuration of Information Processing System

Information processing system 1 according to an embodiment will be described below with reference to the drawings.

Figure 1:
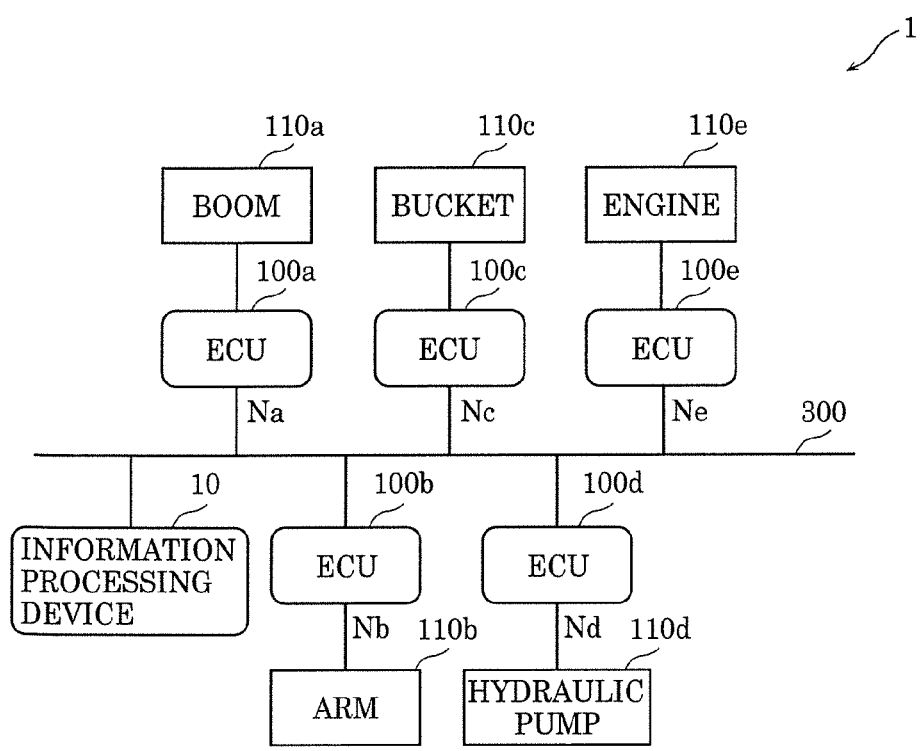
FIG. 1 is a configuration diagram illustrating an example of an information processing system according to an embodiment.

FIG. 1 is a configuration diagram illustrating an example of information processing system 1 according to an embodiment. FIG. 1 also illustrates components (boom 110a, arm 110b, bucket 110c, hydraulic pump 110d, and engine 110e) other than those of information processing system 1.

Information processing system 1 is an in-vehicle network provided in a vehicle, for example. Information processing system 1 includes information processing device 10, a plurality of ECUs, and network 300. Network 300 is, for example, a CAN that is based on the SAE J1939 standard. The plurality of ECUs transmit and receive messages to and from each other via network 300 in accordance with the SAE J1939 standard. For example, in one embodiment, information processing system 1 includes, as the plurality of ECUs, ECUs 100a to 100e. If ECU 100a is described in particular, ECU 100a transmits and receives messages to and from ECUs 100b to 100e via network 300. In the embodiment, ECUs 100a to 100e are also referred to collectively as ECUs 100. In other words, an ECU referred to as ECU 100 in the embodiment may be any one of ECUs 100a to 100e. Information processing device 10 is one type of ECU. Information processing device 10 transmits and receives messages to and from the plurality of ECUs 100 via network 300.

The SAE J1939 standard is a control bus standard applied to trucks, busses, construction machines, tractors, trailers, ships, or the like. ECUs in such moving bodies transmit and receive messages to and from each other in accordance with the SAE J1939 standard. In other words, ECUs 100 transmit and receive messages via network 300 within a moving body in accordance with the SAE J1939 standard. In the following, information processing system 1 applied to a construction machine will be described.

Information processing device 10 detects a malicious message in network 300 in which the plurality of ECUs 100 are connected. Information processing device 10 is, for example, a malicious message detecting ECU. Details of information processing device 10 will be described later.

ECU 100a is an inertial measurement unit (IMU) that detects the attitude angle, the angular velocity, and so on of boom 110a of the construction machine. ECU 100b is an IMU that detects the attitude angle, the angular velocity, and so on of arm 110b of the construction machine. ECU 100c is an IMU that detects the attitude angle, the angular velocity, and so on of bucket 110c of the construction machine. ECU 100d controls hydraulic pump 110d that, for example but not limited to, changes the attitude of or moves boom 110a, arm 110b, bucket 110c, and so on. For example, ECU 100d successively receives sensing data on the attitude angles, the angular velocities, and so on transmitted periodically from ECUs 100a to 100c. Thus, ECU 100d estimates the position and the velocity of bucket 110c at the distal end of boom 110a and arm 110b and automatically controls boom 110a, arm 110b, bucket 110c, and so on via hydraulic pump 110d so as to keep bucket 110c from colliding with the ground surface and to keep the construction machine from being damaged. ECU 100e controls engine 110e of the construction machine. One or more ECUs other than ECUs 100 described above may also be connected to network 300.

Information processing device 10 and ECUs 100 each include a processor (microprocessor), a digital circuit such as a memory, an analog circuit, and a communication circuit, for example. The memory is, for example but not limited to, a read-only memory (ROM) or a random-access memory (RAM) and can store a program to be executed by the processor. For example, as the processor operates in accordance with the program, information processing device 10 and ECUs 100 each implement various functions.

The plurality of ECUs 100 each receive, from network 300, a message transmitted by others ECU 100. In addition, the plurality of ECUs 100 each generate a message that includes the content to be transmitted to other ECUs 100 and transmit the generated message to network 300. Specifically, the plurality of ECUs 100 each perform a process corresponding to the content of a received message. In addition, the plurality of ECUs 100 each generate a normal message that includes data indicating the status of the device connected to each ECU 100 (e.g., sensing data on the attitude angle, the angular velocity, and so on) or data on the command value (control value) or the like for other ECUs 100 and transmit the generated message periodically. Furthermore, the plurality of ECUs 100 each transmit, to network 300, a claim message claiming a source address (hereinafter, abbreviated to SA) that is unique in network 300 and that each ECU 100 desires to use in network 300. Then, the plurality of ECUs 100 each start transmitting a normal message that includes the SA to network 300. Specifically, the plurality of ECUs 100 each start transmitting, to network 300, the normal message including the SA that each ECU 100 desires to use in network 300 if ECU 100 that has transmitted the claim message receives no response to the transmitted claim message from other ECU(s) 100 within a prescribed time (e.g., 250 ms) from the transmission of the claim message. The claim message to be transmitted to network 300 by each of the plurality of ECUs 100 further includes a device name (hereinafter, abbreviated to DN) assigned in advance and unique to each of the plurality of ECUs 100. The claim message will be described later. Herein, a message that includes data indicating the status of a device or data on a command value or the like is called a normal message in order to distinguish it from a claim message. A normal message includes a CAN ID, and the plurality of ECUs 100 each receive only a message that includes a specific CAN ID. Thus, the plurality of ECUs 100 can each transmit a normal message to target ECU 100.

The plurality of ECUs 100 each have a 64-bit unique DN assigned thereto in advance at the time of its manufacture or the like, for example. The DN needs to be unique to each ECU 100. Thus, a DN that is different from the DNs of any other ECUs in or outside network 300 is assigned to each ECU 100. In one embodiment, for example, as illustrated in FIG. 1, Na is assigned to ECU 100*a* as its DN, Nb is assigned to ECU 100*b* as its DN, Nc is assigned to ECU 100*c* as its DN, Nd is assigned to ECU 100*d* as its DN, and Ne is assigned to ECU 100*e* as its DN. Meanwhile, if a 64-bit DN is used each time in the communication between ECUs 100 in order to identify the sender, the amount of data that can be transmitted is reduced by the amount used by the DN (64 bits). Therefore, a unique 8-bit SA is used in network 300. A CAN ID includes an 8-bit SA, and ECU 100 that has received a normal message that includes a CAN ID can identify the sender by checking the SA included in the CAN ID.

Format of CAN ID

Now, a format of a CAN ID to be included in a normal message used in the SAE J1939 standard will be described.

Figure 2:
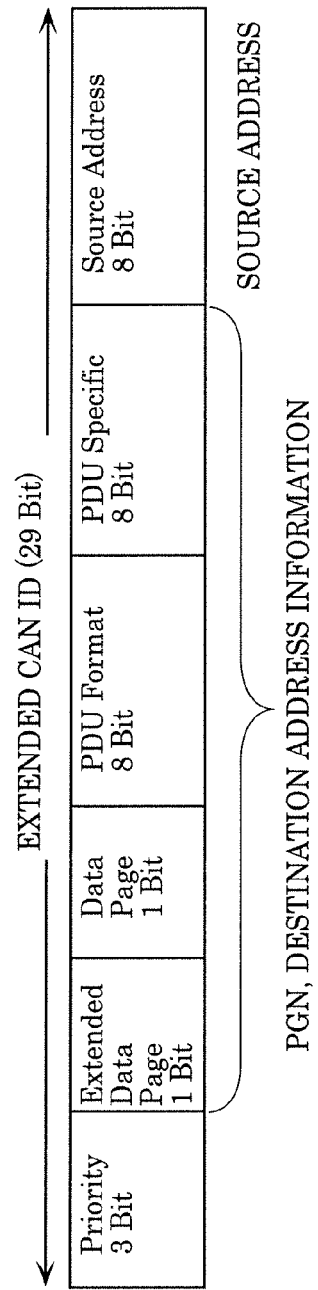
FIG. 2 illustrates a format of a data frame used in the SAE J1939 standard.

FIG. 2 illustrates a format of a CAN ID used in the SAE J1939 standard. FIG. 2 illustrates a format of a 29-bit extended CAN ID that has been extended for a control bus applied to trucks, busses, construction machines, tractors, trailers, ships, or the like, with an 11-bit standard ID format defined by a CAN protocol serving as a base. A normal message transmitted to network 300 by each of the plurality of ECUs 100 includes an extended CAN ID, and the extended CAN ID includes an identifier that uniquely determines the format of the normal message. In other words, the normal message includes this identifier. The identifier is, for example, a parameter group number (PGN). Although detailed description is omitted, it can be seen that, in addition of the field that includes the PGN, the destination address information, and so on, the SA for identifying the sender is assigned to the extended CAN ID in its lower 8 bits. The plurality of ECUs 100 each negotiate with other ECUs 100 by transmitting a claim message after starting and acquire an SA that does not compete with the SAs of other ECUs 100. A claim message is used for ECU 100 to acquire an SA that ECU 100 desires to use in network 300, and the claim message includes the DN assigned to ECU 100 and the SA that this ECU 100 desires to use in network 300. A claim message is an ACL message defined by the SAE J1939 standard, for example. Basically, a claim message is transmitted to network 300 from ECU 100 when ECU 100 starts. Other ECUs 100 that have received the claim message can confirm that ECU 100 having the DN included in the claim message assigned thereto is trying to acquire the SA included in the claim message. How ECU 100 claims an SA that this ECU 100 desires to use by transmitting a claim message will be described later in detail.

The present disclosure may be applied to standards other than the SAE J1939 standard. For example, the present disclosure can be applied to, for example but not limited to, a standard that is an application of the SAE J1939 standard (e.g., International Organization for Standardization (ISO) 11783, National Marine Electronics Association (NMEA) 2000, ISO 11992, or Fleet Management System (FMS)).

Claim Message

Now, how each ECU 100 claims an SA that each ECU 100 desires to use in network 300 will be described.

Each ECU 100 transmits a claim message to network 300 in order to use an SA that makes itself recognized by other ECUs 100 in information processing system 1 and that does not compete with the SAs of other ECUs 100. Now, with reference to FIG. 3, a rule to be applied when an ECU claims an SA that this ECU desires to use by transmitting a claim message (ACL message) will be described.

Figure 3:
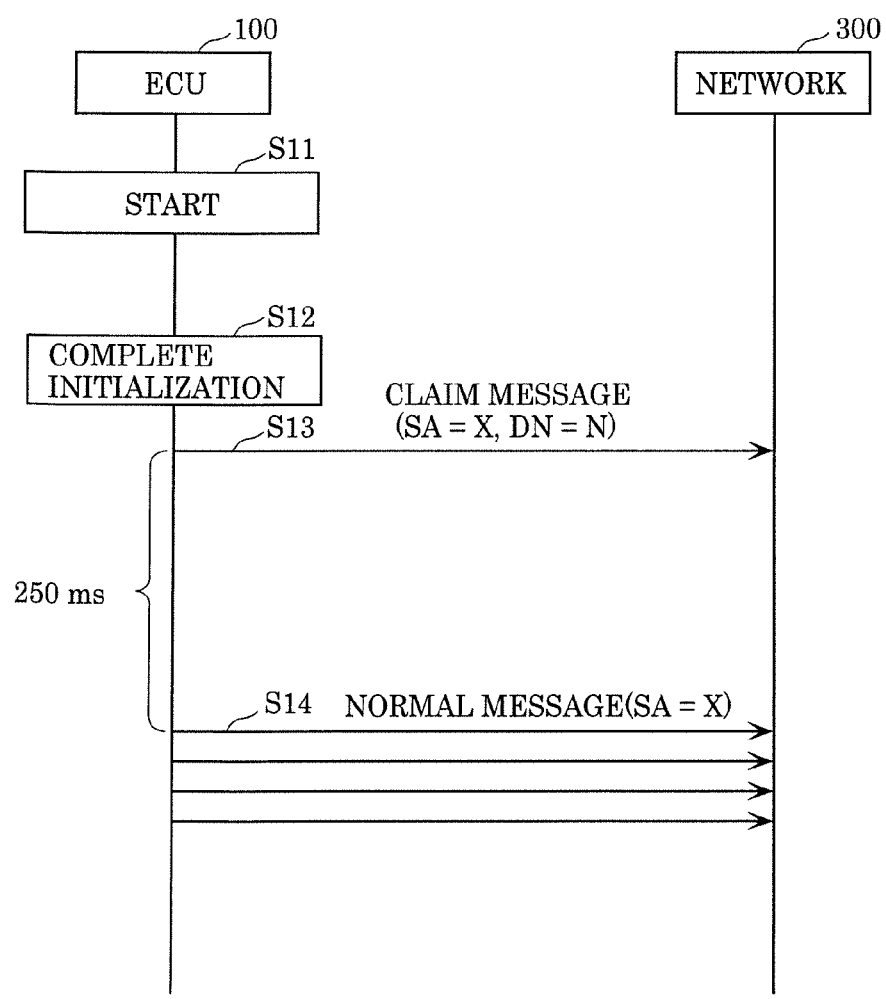
FIG. 3 is a sequence diagram for describing a rule to be applied when an ECU claims a source address that the ECU desires to use by transmitting a claim message.

FIG. 3 is a sequence diagram for describing the rule to be applied when ECU 100 claims an SA that this ECU 100 desires to use by transmitting a claim message.

First, ECU 100 starts (step S11). After starting, the plurality of ECUs 100 each perform an operation for acquiring an 8-bit SA that each ECU 100 desires.

Upon completion of initialization after starting (step S12), ECU 100 transmits, to network 300, a claim message that includes an SA that ECU 100 desires (e.g., ECU 100 desires X as its SA in this example) and the DN (e.g., N) of ECU 100 (step S13). In other words, ECU 100 broadcasts such a claim message to other ECUs 100 via network 300 to claim to other ECUs 100 that ECU 100 is to use X as its SA.

According to the SAE J1939 standard, the plurality of ECUs 100 each store in itself information that ECU 100 having N assigned thereto as its DN uses X as its SA, unless the plurality of ECUs 100 have objections to the claim message. On the other hand, if there is ECU 100 that has an objection to the claim message—for example, if the claimed SA is in competition, the rule states that objecting ECU 100 sends a response to the claim message within a prescribed time (250 ms in the SAE J1939 standard) from the reception of the claim message. Therefore, if ECU 100 receives no response (no objection) from other ECUs 100 in regard to the transmitted claim message within the prescribed time from the transmission of the claim message, ECU 100 concludes that other ECUs 100 have accepted that ECU 100 uses X as its SA. Thus, using the SA that ECU 100 desires to use, ECU 100 starts transmitting (periodically transmitting) a normal message that includes this SA to network 300 (step S14). Since the normal message includes X as the SA, other ECUs 100 can identify ECU 100 having N assigned thereto as its DN as the sender of the message by confirming that the SA included in this message is X.

Now, with reference to FIG. 4, a rule to be applied when an SA is in competition will be described.

Figure 4:
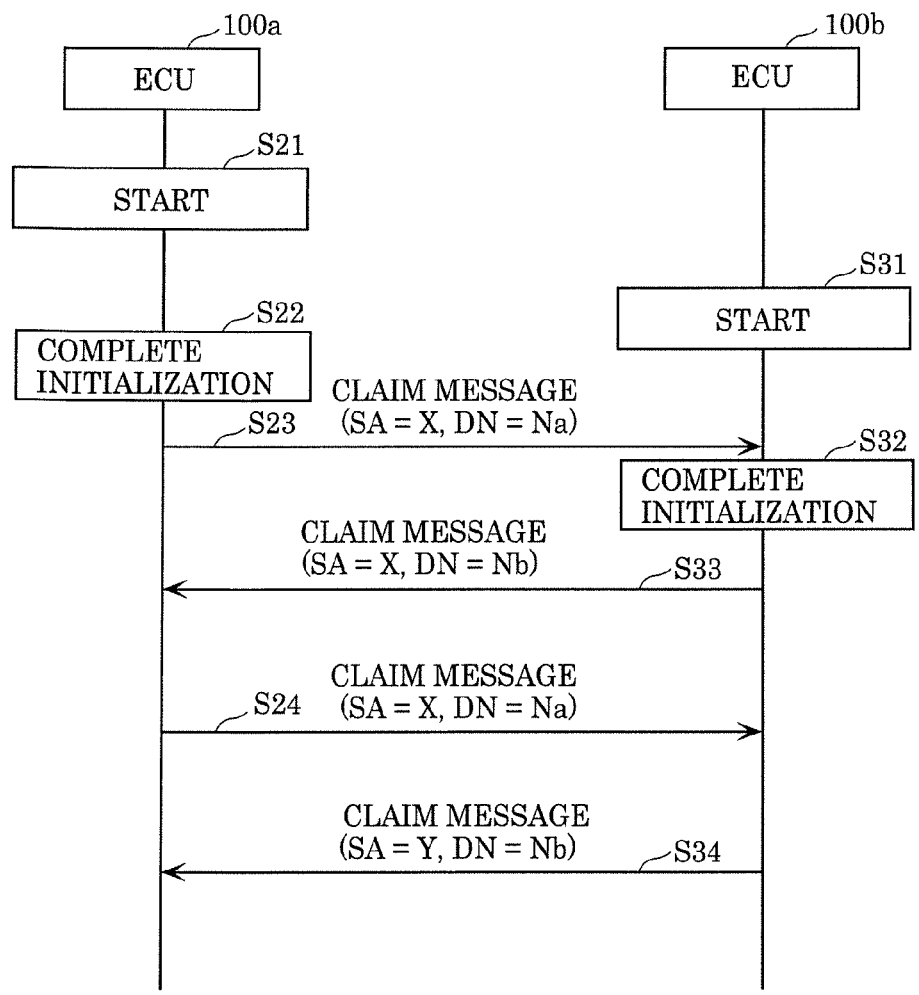
FIG. 4 is a sequence diagram for describing a rule to be applied when a source address is in competition.

FIG. 4 is a sequence diagram for describing the rule to be applied when an SA is in competition. FIG. 4 illustrates an example in which, when an SA is in competition, ECUs 100 competing for the SA resolve the competition and acquire their respective SAs. In FIG. 4, ECUs 100*a* and 100*b* are illustrated as examples of ECUs 100 competing for the SA. Although ECU 100*a* and ECU 100*b* are shown to be in direct communication with each other in FIG. 4, ECU 100*a* and ECU 100*b* actually communicate with each other via network 300. In the following, there may be a case where one ECU 100 and other ECU 100 are said to transmit and receive messages and so on to and from each other, and such an expression is used for the following reason. One ECU 100 transmits a message and so on to network 300. Other ECU 100 receives this message and so on from network 300. Other ECU 100 transmits a message and so on to network 300. One ECU 100 receives this message and so on from network 300. As a result, one ECU 100 and other ECU 100 transmit and receive messages and so on to and from each other.

As illustrated in FIG. 4, ECU 100*a* starts (step S21). Upon completion of initialization after starting (step S22), ECU 100*a* transmits, to ECU 100*b*, a claim message that includes an SA (e.g., X in this example) that ECU 100*a* desires to use in network 300 and Na, which is the DN of ECU 100*a*, (step S23).

ECU 100*b* starts, for example, after ECU 100*a* has started (step S31). Because the claim message has been transmitted from ECU 100*a* before ECU 100*b* completes initialization, ECU 100*b* cannot receive the claim message from ECU 100*a*. ECU 100*a* receives no response to the transmitted claim message from other ECUs 100 including ECU 100*b*. Therefore, using X as its SA, ECU 100*a* starts transmitting a normal message that includes X as the SA.

Upon completion of initialization after starting (step S32), because ECU 100*b* is not aware that ECU 100*a* has claimed its desire to use X as the SA, ECU 100*b* transmits, to ECU 100*a*, a claim message that includes an SA that ECU 100*b* desires to use in network 300 (in this example, the SA is X that is identical to the SA that ECU 100*a* has desired to use and has started using) and Nb, which is the DN of ECU 100*b*, (step S33).

SAE J1939 defines a rule that states that, when an SA is in competition, ECU 100 whose value indicated by its DN (specifically, a 64-bit integer value) is smaller has priority in acquiring the SA. Therefore, ECU 100 whose value indicated by the DN is larger is set to give up acquiring the competing SA and retransmits a claim message that includes a different SA.

ECU 100*a* has acquired X as its SA, and ECU 100*b* has transmitted the claim message announcing that ECU 100*b* desires to use X as its SA. This results in a competition for the SA. The assumption is that Na, which is the DN of ECU 100*a*, is smaller than Nb, which is the DN of ECU 100*b*. In this case, ECU 100*a* has priority in acquiring the SA over ECU 100*b*. Thus, ECU 100*a* retransmits, to ECU 100*b*, a claim message that includes X as its SA and Na, which is the DN of ECU 100*a*, as an objection to the claim message transmitted by ECU 100*b* (step S24).

ECU 100*b* recognizes that ECU 100*a* having Na smaller than Nb, which is the DN of ECU 100*b*, assigned thereto has priority in using X as the SA and transmits a claim message that includes Y (e.g., an address adjacent to X, Y=X+1) as another SA (step S34). ECU 100*b* uses Y as its SA if ECU 100*b* receives no response, from other ECUs 100, to the claim message that ECU 100*b* has transmitted, within a prescribed time (250 ms) from the transmission of the claim message.

Malicious Use of Claim Message

Now, with reference to FIG. 5, a possibility that a claim message of the SAE J1939 standard can be used maliciously will be described.

Figure 5:
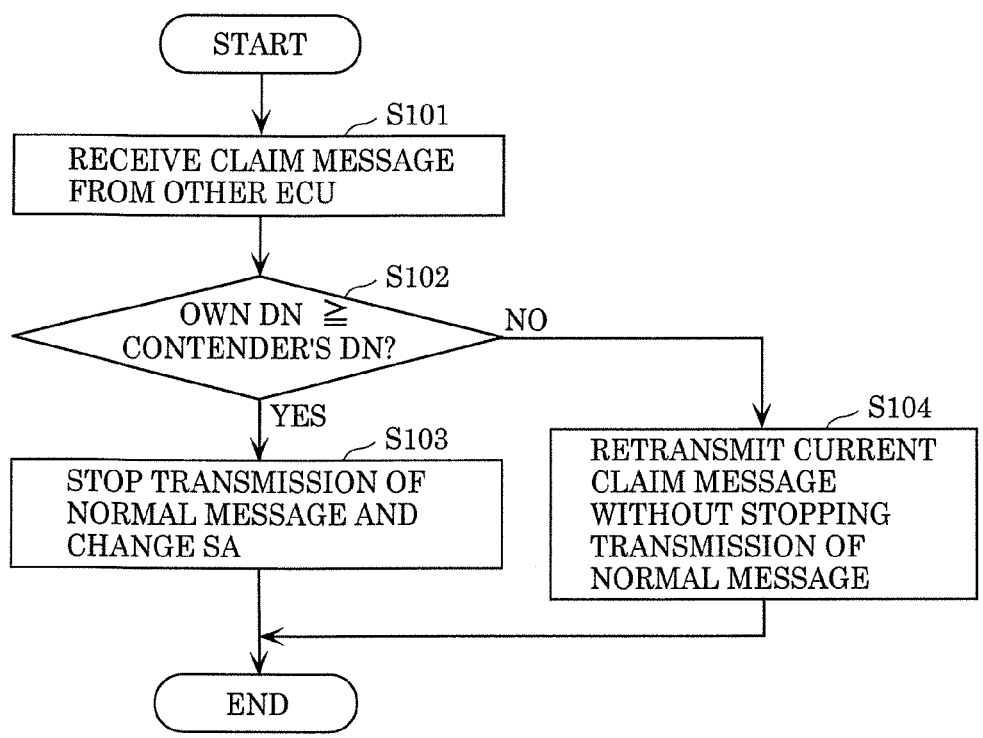
FIG. 5 is a flowchart for describing how a claim message can be used maliciously.

FIG. 5 is a flowchart for describing how a claim message of the SAE J1939 standard can be used maliciously. The flowchart illustrated in FIG. 5 shows an operation of ECU 100 that has already started transmitting a normal message with the use of a desired SA when ECU 100 has received a claim message from other ECU 100.

ECU 100 receives a claim message from other ECU 100 (step S101). For example, ECU 100 receives, from other ECU 100, a claim message that includes an SA identical to the SA that ECU 100 uses.

ECU 100 compares the value indicated by its own DN (own DN) with the value indicated by the DN (the contender's DN) included in the received claim message and determines whether the value indicated by the own DN is greater than or equal to the value indicated by the contender's DN (step S102).

If the value indicated by the own DN is smaller than the value indicated by the contender's DN (No in step S102), ECU 100 has priority over the contender. Thus, ECU 100 transmits, to other ECU 100, a claim message that includes the SA that ECU 100 has acquired and the DN of ECU 100 without stopping transmission of normal messages (step S104). This allows other ECU 100 to recognize that other ECU 100 cannot acquire that SA.

Meanwhile, if the value indicated by the own DN is greater than or equal to the value indicated by the contender's DN (Yes in step S102), the contender has priority over ECU 100. Thus, ECU 100 stops transmission of normal messages and tries to change the SA (step S103). For example, ECU 100 transmits, to network 300, a claim message that includes an SA that is an address adjacent to the SA that ECU 100 has been using.

Here, as indicated by step S102, the SAE J1939 standard defines that a party determines that it has lower priority than the contender when the value indicated by the contender's DN included in the received message is equal to or smaller than the value indicated by the own DN. Therefore, if ECU 100 receives a malicious claim message that includes an SA identical to the SA of ECU 100, ECU 100 may be forced to stop transmitting a normal message and even to change the SA that ECU 100 has been using. Now, with reference to FIG. 6, the situation of network 300 in a normal operation and in an attack (when a malicious message is present in network 300) will be described.

Figure 6:
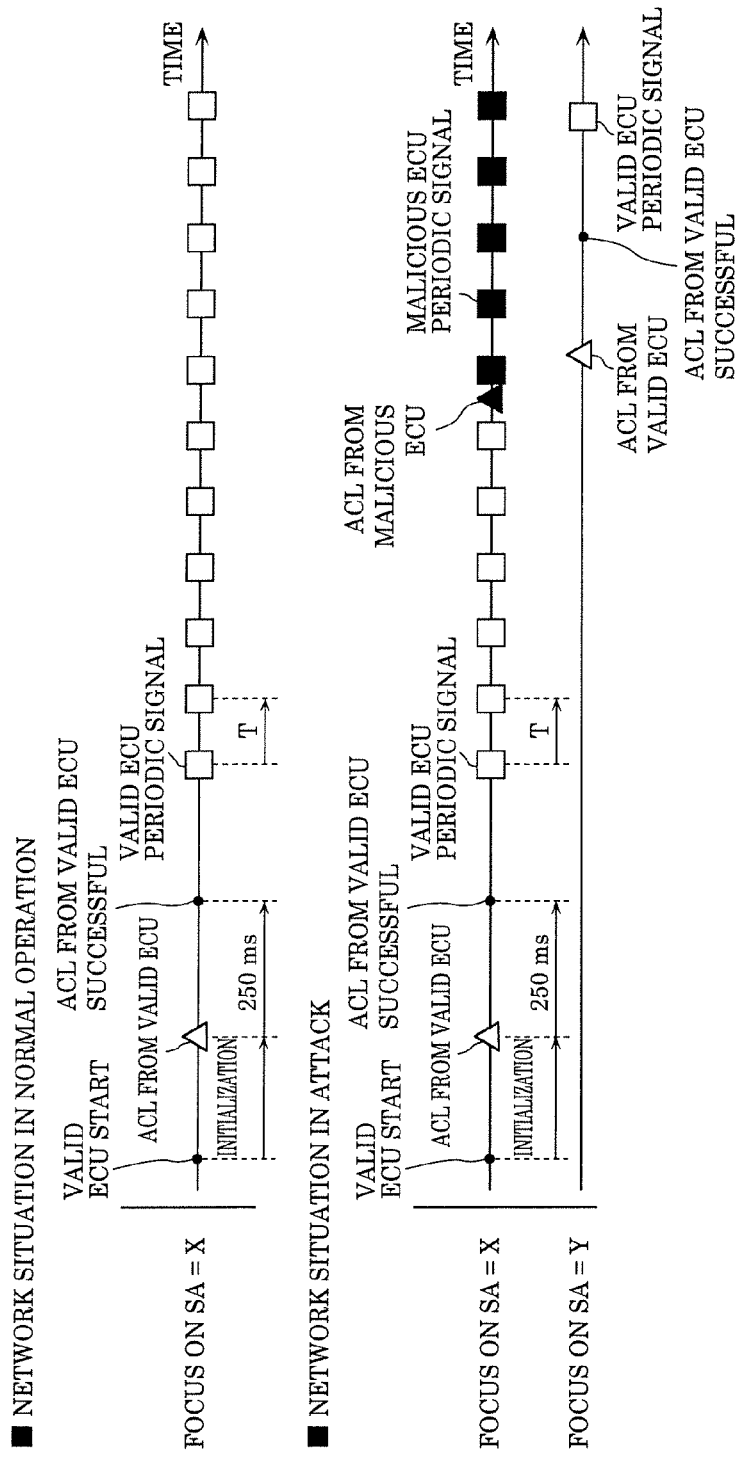
FIG. 6 is an illustration for describing the situation of a network in a normal operation and in an attack.

FIG. 6 is an illustration for describing the situation of network 300 in a normal operation and in an attack. FIG. 6 illustrates timings at which messages (normal message or claim message) that include a specific SA (e.g., SA=X and/or SA=Y) appear. In FIG. 6 and in FIGS. 9 to 12 described later, a claim message is indicated as "ACL", and a normal message is indicated as a periodic signal with a period of T. This is because a claim message corresponds to an ACL message in the SAE J1939 standard and a normal message is a periodic signal of sensing data or the like transmitted periodically from ECUs 100*a* to 100*c* and so on to network 300, for example. In addition, in FIG. 6 and in FIGS. 9 to 12 described later, a claim message transmitted by valid ECU 100 is indicated by an open triangle, a normal message transmitted by valid ECU 100 is indicated by an open square, a claim message transmitted by a malicious ECU is indicated by a solid triangle, and a normal message transmitted by a malicious ECU is indicated by a solid square.

As shown in the section "NETWORK SITUATION IN NORMAL OPERATION" in FIG. 6, for example, valid ECU 100 starts first. After initialization, valid ECU 100 transmits, to network 300, a claim message that includes X as the SA that valid ECU 100 desires to use. Valid ECU 100 uses X as its SA thereafter if valid ECU 100 receives no response to the transmitted claim message from other ECUs 100 within a prescribed time (250 ms) from the transmission of the claim message ("ACL SUCCESSFUL" in FIG. 6). Then, valid ECU 100 periodically transmits a normal message that includes X as the SA. This allows other ECUs 100 to periodically receive this normal message and to perform a process corresponding to the data included in the received normal message. For example, ECU 100*d* that controls hydraulic pump 110*d* periodically receives the sensing data on the attitude angles, the angular velocities, and so on of boom 110*a*, arm 110*b*, and bucket 110*c* from ECUs 100*a* to 100*c*. Thus, ECU 100*d* can automatically control boom 110*a*, arm 110*b*, and bucket 110*c*.

Meanwhile, as shown in the section "NETWORK SITUATION IN ATTACK" in FIG. 6, while valid ECU 100 is transmitting normal messages using X as the SA that valid ECU 100 desires to use, as in the case where valid ECU 100 operates in a normal operation, a malicious ECU may transmit, to network 300, a claim message that includes X as its SA and a DN that is equal to or smaller than the DN of valid ECU 100. In this case, since the malicious ECU has priority over valid ECU 100, valid ECU 100 stops transmitting a normal message, stops using X as the SA that valid ECU 100 has been using so far, and retransmits, to network 300, a claim message that includes Y as the SA that valid ECU 100 desires to use. As illustrated in FIG. 6, the messages by the malicious ECU and the messages by valid ECU 100 are transmitted to network 300 at different timings. This is because only one piece of data can exist at a given time in one network 300.

Valid ECU 100 uses Y as its SA thereafter if valid ECU 100 receives no response to the transmitted claim message from other ECUs 100 within a prescribed time (250 ms) from the transmission of the claim message. In this manner, valid ECU 100 is forced to change the SA that valid ECU 100 has been using.

For example, even if someone sees, as a normal message, data that includes a specific SA and sensor values of the attitude angle, the angular velocity, and so on, he/she cannot figure out which ECU is ECU 100 that is using this SA. Yet, he/she can recognize that a specific SA is used by ECU 100a that detects the attitude angle, the angular velocity, and so on of boom 110a by checking the SA included in the data in which the sensor values change greatly in response to him/her moving boom 110a. In a similar manner, he/she can recognize that a specific SA is used by ECU 100b that detects the attitude angle, the angular velocity, and so on of arm 110b by checking the SA included in the data in which the sensor values change greatly in response to him/her moving arm 110b. In a similar manner, he/she can recognize that a specific SA is used by ECU 100c that detects the attitude angle, the angular velocity, and so on of bucket 110c by checking the SA included in the data in which the sensor values change greatly in response to him/her moving bucket 110c.

In this manner, in a hydraulic shovel in a construction machine, for example, the correspondence relationship between ECUs 100a to 100c that detect the attitude angles, the angular velocities, and so on of boom 110a, arm 110b, and bucket 110c and the respective SAs that ECUs 100a to 100c use is managed. Therefore, if the SA that ECU 100 has been using is changed due to a malicious message in network 300, the actual correspondence relationship fails to match the managed correspondence relationship, and this may cause a problem.

As a spoof of valid ECU 100, a malicious ECU takes over the function of valid ECU 100 and periodically transmits, to network 300, a normal message that includes X as the SA with a period that does not deviate from the period of normal messages that valid ECU 100 has transmitted so far. For example, ECU 100d that controls hydraulic pump 110d determines whether the period of normal messages (periodic signals) received from valid ECUs 100a to 100c has not changed and can detect a malicious message in network 300 based on any change in the period of the received normal messages. Therefore, the malicious ECU may skillfully spoof valid ECUs 100a to 100c and so on so that the malicious message is not detected from a change in the period and may conceivably take over the function of transmitting normal messages while maintaining the periodicity of the normal messages that valid ECUs 100a to 100c and so on have transmitted so far. Therefore, ECU 100d mistakenly recognizes that a received normal message is a message from valid ECUs 100a to 100c and so on and controls hydraulic pump 110d in accordance with the normal message received from the malicious ECU. As a result, for example, although bucket 110c is actually about to collide with the ground surface, the malicious ECU may transmit a normal message that includes the sensor values of the attitude angles, the angular velocities, and so on of boom 110a, arm 110b, and bucket 110c indicating that none of boom 110a, arm 110b, and bucket 110c are to collide with the ground surface, and this may cause the construction machine to be damaged.

Accordingly, in one embodiment of the present disclosure, information processing device 10 that detects a malicious message in network 300 is connected to network 300 in which a plurality of ECUs 100 are connected. In the following, a configuration and an operation of information processing device 10 will be described.

Configuration and Operation of Information Processing Device

Figure 7:
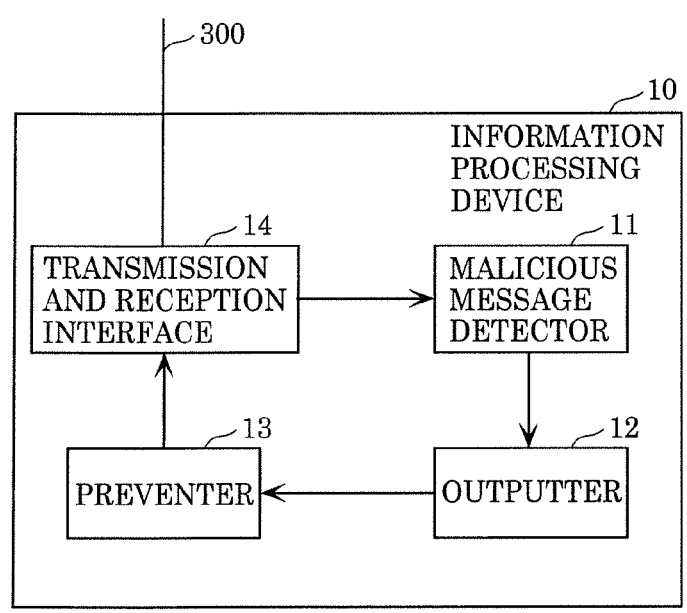
FIG. 7 is a block diagram illustrating an example of an information processing device according to an embodiment.

FIG. 7 is a block diagram illustrating an example of information processing device 10 according to the embodiment.

Figure 8:
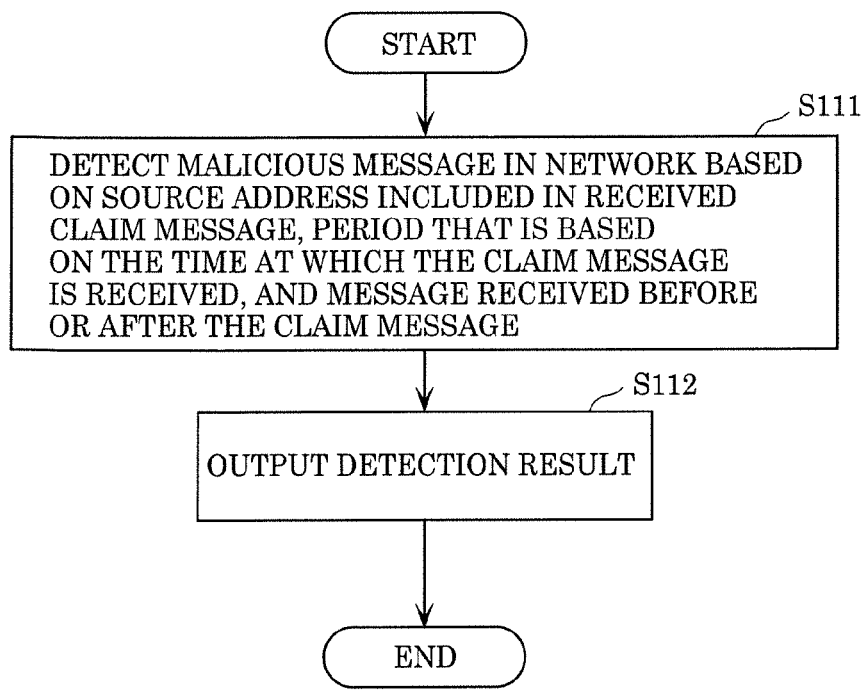
FIG. 8 is a flowchart illustrating an example of an operation of an information processing device according to an embodiment.

FIG. 8 is a flowchart illustrating an example of an operation of information processing device 10 according to the embodiment.

Information processing device 10 includes malicious message detector 11, outputter 12, preventer 13, and transmission and reception interface 14.

Transmission and reception interface 14 receives a message flowing in network 300 and also transmits a message to network 300. For example, transmission and reception interface 14 is implemented by a communication circuit, an input and output interface, and so on provided in information processing device 10.

Malicious message detector 11 is a characteristic configuration of information processing device 10 and is a functional component for detecting a malicious message in network 300. Malicious message detector 11 detects a malicious message in network 300 based on an SA included in a claim message received from network 300, a period that is based on the time at which the claim message is received, and a message received from network 300 before or after the claim message (step S111).

With regard to the method with which malicious message detector 11 detects a malicious message, first to fourth examples will be described in the present disclosure.

In the first to third examples, malicious message detector 11 detects a malicious message in network 300 based on an SA included in a claim message received from network 300 and a message received from network 300 in a predetermined period that is based on the time at which the claim message is received. For example, in the first and second examples, malicious message detector 11 detects a malicious message in network 300 based on an SA included in a claim message received from network 300 and a normal message received from network 300 in a predetermined period that is based on the time at which the claim message is received. Meanwhile, for example, in the third example, malicious message detector 11 detects a malicious message in network 300 based on an SA included in a claim message received from network 300 and another claim message received from network 300 in a predetermined period that is based on the time at which the claim message is received. In other words, in the first and second examples, a malicious message in network 300 is detected based on a normal message received from network 300 in a predetermined period. In the third example, a malicious message in network 300 is detected based on a claim message received from network 300 in a predetermined period.

In the fourth example, malicious message detector 11 detects a malicious message in network 300 based on an SA included in a claim message received from network 300 and a plurality of normal messages received from network 300 after a predetermined time has passed since the time at which the claim message was received.

Details of the first to fourth examples of the method with which malicious message detector 11 (information processing device 10) detects a malicious message will be described with reference to FIGS. 9 to 12 described later.

Outputter 12 outputs a detection result of malicious message detector 11 (step S112). For example, outputter 12 outputs the detection result to preventer 13. In addition, outputter 12 may output the detection result to, for example but not limited to, a user of a vehicle or the like in which information processing device 10 is provided or a central management center that manages the vehicle, via transmission and reception interface 14.

In the first and second examples described later, if the detection result of malicious message detector 11 indicates that the claim message is a malicious message, malicious message detector 11 transmits, to network 300, a signal that disables the claim message. The signal that disables the claim message is, for example, an error frame, and this can force the claim message to result in an error before valid ECU 100 in network 300 finishes receiving the claim message (the malicious message). In other words, the signal can keep valid ECU 100 from being forced to change the SA that valid ECU has been using by the claim message.

For example, a processor provided in information processing device 10 operates in accordance with a program stored in a memory provided in information processing device 10, and thus the functions of malicious message detector 11, outputter 12, and preventer 13 are implemented.

First Example of Method of Detecting Malicious Message

Figure 9:
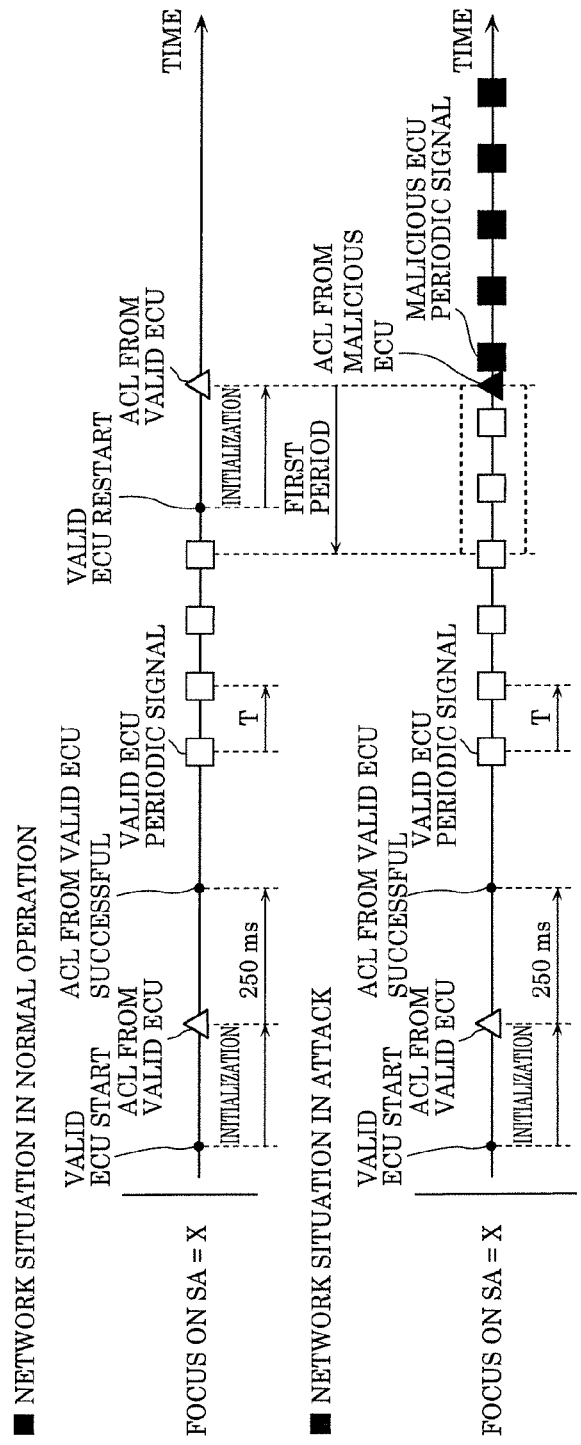
FIG. 9 is an illustration for describing a first example of a method with which an information processing device detects a malicious message according to an embodiment.

FIG. 9 is an illustration for describing the first example of the method with which information processing device 10 detects a malicious message according to the embodiment. FIG. 9 illustrates timings at which messages (normal message or claim message) that include a specific SA (e.g., SA=X) appear.

As shown in the section "NETWORK SITUATION IN NORMAL OPERATION" in FIG. 9, for example, valid ECU 100 starts first. After initialization, valid ECU 100 transmits, to network 300, a claim message that includes X as the SA that valid ECU 100 desires to use. Valid ECU 100 uses X as its SA thereafter if valid ECU 100 receives no response to the transmitted claim message from other ECUs 100 within a prescribed time (250 ms) from the transmission of the claim message ("ACL successful" in FIG. 9). Then, valid ECU 100 periodically transmits a normal message that includes X as its SA. Thereafter, valid ECU 100 transmits a claim message only when valid ECU 100 restarts, except in a case where valid ECU 100 is instructed to transmit a claim message by other ECUs 100 (specifically, except in a case where valid ECU 100 receives a request for address claim message from other ECUs 100). In this case, valid ECU 100 first performs an initialization operation and so on upon restarting, and thus valid ECU 100 does not transmit a normal message that includes X as its SA in a first period, which is a predetermined period running up to when valid ECU 100 transmits a claim message that includes X as its SA. Therefore, in a normal operation, if information processing device 10 receives, from network 300, a claim message that includes X as the SA, information processing device 10 does not receive any normal message that includes X as the SA in the first period that precedes when information processing device 10 receives the claim message. To rephrase, in a normal operation, information processing device 10 does not receive a claim message that includes X as the SA in the first period that follows when information processing device 10 receives a normal message that includes X as the SA.

Meanwhile, as shown in the section "NETWORK SITUATION IN ATTACK" in FIG. 9, while valid ECU 100 is transmitting normal messages using X as the SA that valid ECU 100 desires to use, as in the case where valid ECU 100 operates in a normal operation, a malicious ECU may transmit, to network 300, a claim message that includes X as its SA. In a normal operation, information processing device 10 does not receive any normal message that includes X as the SA in the first period that ends at the time when information processing device 10 receives the claim message. In contrast, in the aforementioned attack, information processing device 10 receives a normal message that includes X as the SA in the first period. Therefore, information processing device 10 can determine that the claim message received at the stated time has been transmitted not from valid ECU 100 but from a malicious ECU.

Accordingly, if an SA included in a normal message received from network 300 in the first period, serving as the predetermined period, that ends at the time at which a claim message is received is identical to an SA included in the claim message received at the stated time, information processing device 10 can determine that the claim message received at the stated time is a malicious message.

There is no particular limitation on the method of determining whether an SA included in a normal message received from network 300 in the first period is identical to an SA included in a claim message received at the stated time. The following two methods serve as examples.

For example, information processing device 10 starts a timer for the first period when information processing device 10 receives a normal message from network 300. Since a normal message is transmitted periodically, information processing device 10 resets the timer for the first period each time information processing device 10 receives a normal message from network 300. If information processing device 10 has received a claim message that includes an SA identical to the SA included in a normal message, information processing device 10 checks the timer (i.e., the timer started when information processing device 10 has received the most recent normal message that includes this SA) and determines whether the first period has expired. If the timer indicates that the first period has expired, information processing device 10 determines that the claim message is a legitimate message. Meanwhile, if the timer indicates that the first period has not expired, information processing device 10 determines that the claim message is a malicious message.

Alternatively, for example, information processing device 10 records the time at which information processing device 10 has received a normal message from network 300. Since a normal message is transmitted periodically, information processing device 10 rerecords the time at which information processing device 10 has received the most recent normal message each time information processing device 10 receives a normal message from network 300. Then, if information processing device 10 has received a claim message that includes an SA identical to the SA included in a normal message, information processing device 10 determines whether the difference between the time at which information processing device 10 has received this claim message and the time at which information processing device 10 has received the most recent normal message that includes the same SA is greater than the first period. If the difference is greater than the first period, information processing device 10 determines that the claim message is a legitimate message. Meanwhile, if the difference is less than or equal to the first period, information processing device 10 determines that the claim message is a malicious message.

The first period may be defined based on the time it takes for ECU 100 to be initialized, for example. In addition, the first period may be defined based on the period of normal messages. For example, when the period of the normal messages is T, the first period may be set to 2T.

Second Example of Method of Detecting Malicious Message

Figure 10:
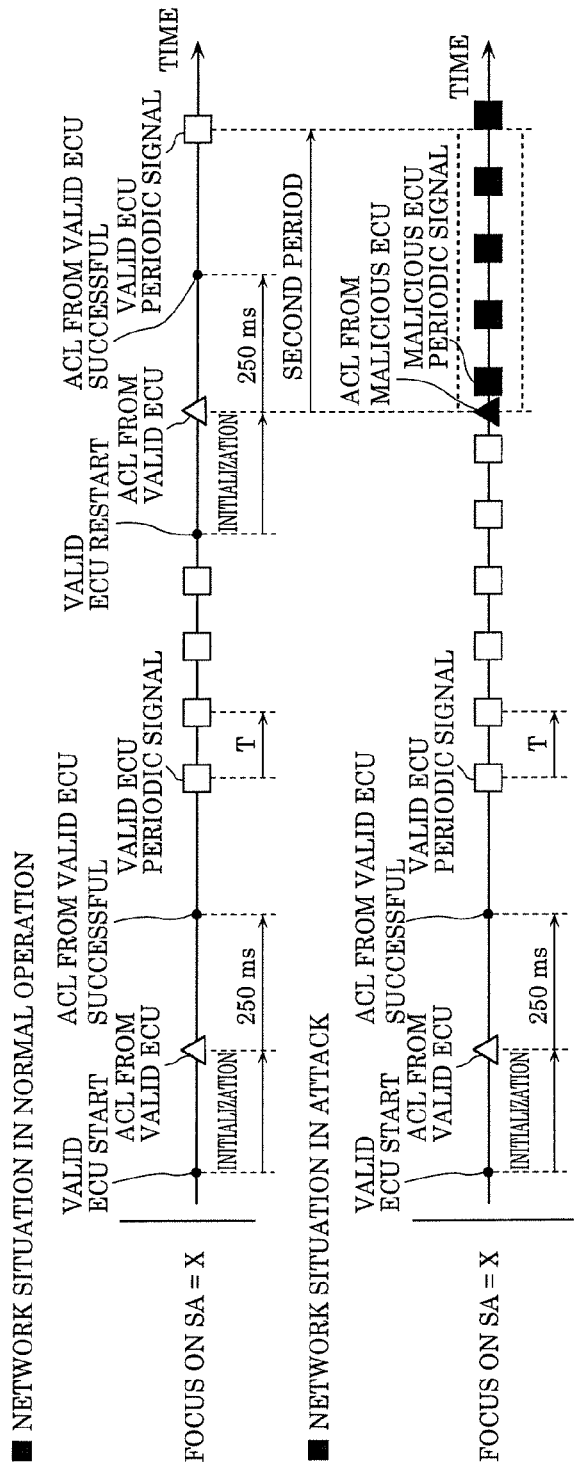
FIG. 10 is an illustration for describing a second example of a method with which an information processing device detects a malicious message according to an embodiment.

FIG. 10 is an illustration for describing the second example of the method with which information processing device 10 detects a malicious message according to the embodiment. FIG. 10 illustrates timings at which messages (normal message or claim message) that include a specific SA (e.g., SA=X) appear.

As shown in the section "NETWORK SITUATION IN NORMAL OPERATION" in FIG. 10, for example, valid ECU 100 starts first. After initialization, valid ECU 100 transmits, to network 300, a claim message that includes X as the SA that valid ECU 100 desires to use. Valid ECU 100 uses X as its SA thereafter if valid ECU 100 receives no response to the transmitted claim message from other ECUs 100 within a prescribed time (250 ms) from the transmission of the claim message ("ACL successful" in FIG. 10). Then, valid ECU 100 periodically transmits a normal message that includes X as its SA. Thereafter, valid ECU 100 may restart, for example as well. In this case as well, after initialization, valid ECU 100 transmits, to network 300, a claim message that includes X as the SA that valid ECU 100 desires to use. Valid ECU 100 uses X as its SA again if valid ECU 100 receives no response to the transmitted claim message from other ECUs 100 within a prescribed time (250 ms) from the transmission of the claim message ("ACL successful" in FIG. 10). Then, valid ECU 100 again periodically transmits a normal message that includes X as its SA. At this point, valid ECU 100 starts transmitting a normal message that includes X as its SA after having waited to see whether valid ECU 100 receives any response to the transmitted claim message from other ECUs 100 within a prescribed time (e.g., 250 ms) from the transmission of the claim message that includes X as the SA. In other words, valid ECU 100 does not transmit a normal message that includes X as its SA for a second period, serving as a predetermined period, since the transmission of the claim message that includes X as the SA. Therefore, in a normal operation, if information processing device 10 receives, from network 300, a claim message that includes X as the SA, information processing device 10 does not receive any normal message that includes X as the SA in the second period that follows when information processing device 10 receives the claim message.

Meanwhile, as shown in the section "NETWORK SITUATION IN ATTACK" in FIG. 10, while valid ECU 100 is transmitting normal messages using X as the SA that valid ECU 100 desires to use, as in the case where valid ECU 100 operates in a normal operation, a malicious ECU may transmit, to network 300, a claim message that includes X as the SA. In a normal operation, information processing device 10 does not receive any normal message that includes X as the SA in the second period that starts at the time at which information processing device 10 receives the claim message, In contrast, in the aforementioned attack, information processing device 10 receives a normal message that includes X as the SA in the second period. Therefore, it can be determined that the claim message received at this time is transmitted not from valid ECU 100 but from a malicious ECU.

Accordingly, if an SA included in a normal message received from network 300 in the second period, serving as the predetermined period, that starts at the time at which a claim message is received is identical to an SA included in the claim message received at the stated time, information processing device 10 can determine that the claim message received at the stated time is a malicious message.

There is no particular limitation on the method of determining whether an SA included in a normal message received from network 300 in the second period is identical to an SA included in a claim message received at the stated time. The following two methods serve as examples.

For example, information processing device 10 starts a timer for the second period when information processing device 10 receives a claim message from network 300. Then, if information processing device 10 has received a normal message that includes an SA identical to the SA included in the claim message, information processing device 10 checks the timer to determine whether the second period has expired. If the timer indicates that the second period has expired, information processing device 10 determines that the claim message is a legitimate message. Meanwhile, if the timer indicates that the second period has not expired, information processing device 10 determines that the claim message is a malicious message.

Alternatively, for example, information processing device 10 records the time at which information processing device 10 has received a claim message from network 300. Then, if information processing device 10 has received a normal message that includes an SA identical to the SA included in the claim message, information processing device 10 determines whether the difference between the time at which information processing device 10 has received this claim message and the time at which information processing device 10 has received the normal message that includes the same SA is greater than the second period. If the difference is greater than the second period, information processing device 10 determines that the claim message is a legitimate message. Meanwhile, if the difference is less than or equal to the second period, information processing device 10 determines that the claim message is a malicious message.

The second period may be defined based on the prescribed time (e.g., 250 ms), for example.

Third Example of Method of Detecting Malicious Message

Figure 11:
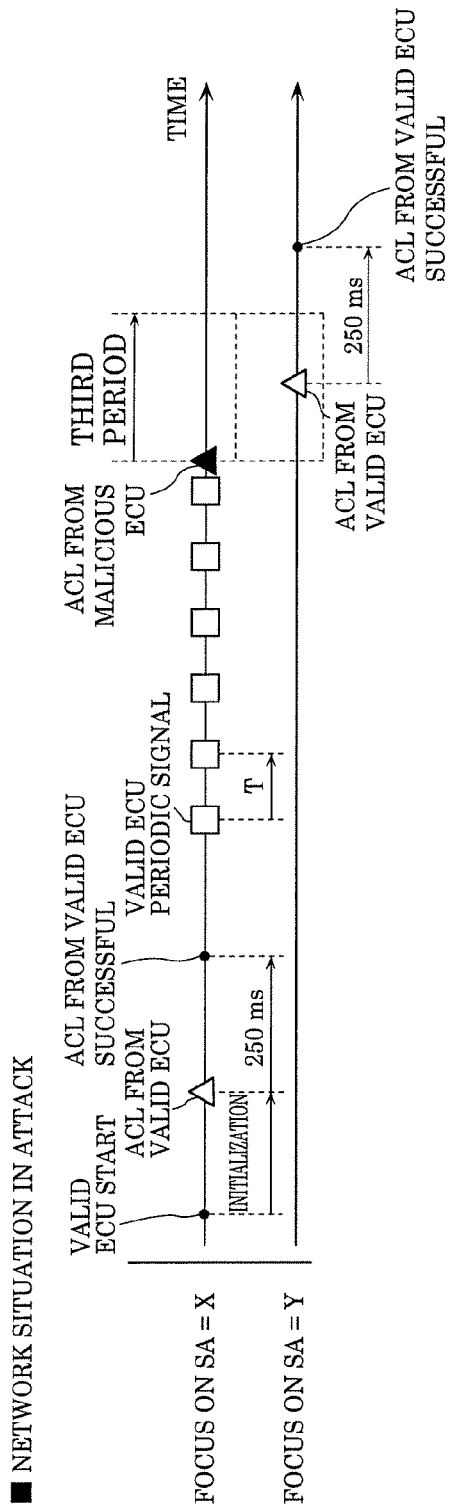
FIG. 11 is an illustration for describing a third example of a method with which an information processing device detects a malicious message according to an embodiment.

FIG. 11 is an illustration for describing the third example of the method with which information processing device 10 detects a malicious message according to the embodiment.

FIG. 11 illustrates timings at which messages (normal message or claim message) that include a specific SA (e.g., SA=X and/or SA=Y) appear.

As shown in the section "NETWORK SITUATION IN ATTACK" in FIG. 11, for example, valid ECU 100 starts first. After initialization, valid ECU 100 transmits, to network 300, a claim message that includes X as the SA that valid ECU 100 desires to use. Valid ECU 100 uses X as its SA thereafter if valid ECU 100 receives no response to the transmitted claim message from other ECUs 100 within a prescribed time (250 ms) from the transmission of the claim message ("ACL successful" in FIG. 11). Then, while valid ECU 100 is periodically transmitting normal messages that include X as the SA, a malicious ECU may transmit, to network 300, a claim message that includes X as the SA and a DN identical to the DN of valid ECU 100. When there is a malicious message in network 300 in this manner, valid ECU 100 stops transmitting a normal message since the malicious ECU has priority over valid ECU 100 and tries to change the SA in a third period that follows when the malicious ECU has transmitted the claim message. For example, in the third period, valid ECU 100 transmits, to network 300, a claim message that includes, as the SA, Y that is an address adjacent to the SA that valid ECU 100 has been using.

In addition, although not illustrated, valid ECU 100 may, for example, restart and transmit, to network 300, a claim message that includes X as the SA that valid ECU 100 desires to use. At this point, in order to cause interference with this claim message, a malicious ECU may transmit, to network 300, a claim message that includes Y as the SA and a DN identical to the DN of valid ECU 100 in the third period that follows when valid ECU 100 transmits the claim message. In this case, since the SAs are not in competition, the two ECUs (one of which is the malicious ECU) with the identical DN transmit, to network 300, normal messages using the different SAs, and this may cause a problem in network 300.

Meanwhile, in a normal operation, after a claim message that includes X as the SA and a specific DN has flowed in network 300, no claim message that includes, as the SA, Y different from X and the specific DN flows in network 300 in the third period. Therefore, in a normal operation, if information processing device 10 receives, from network 300, a claim message that includes X as the SA and a specific DN, information processing device 10 does not receive any claim message that includes, as the SA, Y different from X and the same DN in the third period that follows when information processing device 10 receives the claim message.

Accordingly, if the DN included in a claim message (referred to as a second claim message) received from network 300 in the third period, serving as a predetermined period, that starts at the time at which information processing device 10 has received a claim message (referred to as a first claim message) is identical to the DN included in the first claim message and if the SA included in the second claim message is different from the SA included in the first claim message, information processing device 10 can determine that the first claim message or the second claim message is a malicious message.

There is no particular limitation on the method of determining whether a DN included in a second claim message received from network 300 in the third period is identical to a DN included in a first claim message and whether an SA included in the second claim message is different from an SA included in the first claim message. The following two methods serve as examples.

For example, information processing device 10 starts a timer for the third period when information processing device 10 receives a first claim message from network 300. Then, if information processing device 10 has received a second claim message that includes a DN identical to the DN included in the first claim message and an SA different from the SA included in the first claim message, information processing device 10 checks the timer to determine whether the third period has expired. If the timer indicates that the third period has expired, information processing device 10 determines that the first claim message and the second claim message are legitimate messages. Meanwhile, if the timer indicates that the third period has not expired, information processing device 10 determines that the first claim message or the second claim message is a malicious message.

Alternatively, for example, information processing device 10 records the time at which information processing device 10 has received a first claim message from network 300. Then, if information processing device 10 has received a second claim message that includes a DN identical to the DN included in the first claim message and an SA different from the SA included in the first claim message, information processing device 10 determines whether the difference between the time at which information processing device 10 has received the first claim message and the time at which information processing device 10 has received the second claim message is greater than the third period. If the difference is greater than the third period, information processing device 10 determines that the first claim message and the second claim message are legitimate messages. Meanwhile, if the difference is less than or equal to the third period, information processing device 10 determines that the first claim message or the second claim message is a malicious message.

The third period may be defined based on the time it takes for valid ECU 100 to transmit a claim message upon selecting a different SA when valid ECU 100 has received a claim message that includes a competing SA.

Fourth Example of Method of Detecting Malicious Message

Figure 12:
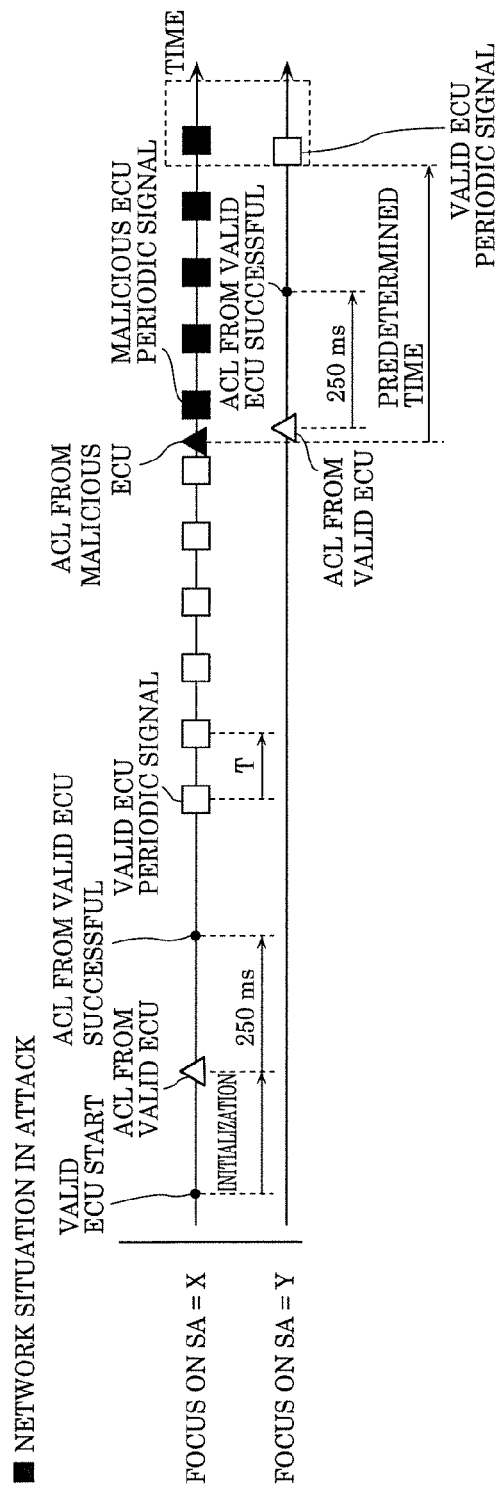
FIG. 12 is an illustration for describing a fourth example of a method with which an information processing device detects a malicious message according to an embodiment.

FIG. 12 is an illustration for describing the fourth example of the method with which information processing device 10 detects a malicious message according to the embodiment. FIG. 12 illustrates timings at which messages (normal message or claim message) that include a specific SA (e.g., SA=X and/or SA=Y) appear.

As shown in the section "NETWORK SITUATION IN ATTACK" illustrated in FIG. 12, for example, valid ECU 100 starts first. After initialization, valid ECU 100 transmits, to network 300, a claim message that includes X as the SA that valid ECU 100 desires to use. Valid ECU 100 uses X as its SA thereafter if valid ECU 100 receives no response to the transmitted claim message from other ECUs 100 within a prescribed time (250 ms) from the transmission of the claim message ("ACL successful" in FIG. 12). Then, while valid ECU 100 is periodically transmitting normal messages that include X as the SA, a malicious ECU may transmit, to network 300, a claim message that includes X as the SA and a DN that is equal to or smaller than the DN of valid ECU 100. When there is a malicious message in network 300 in this manner, valid ECU 100 stops transmitting a normal message since the malicious ECU has priority over valid ECU 100, tries to change the SA, and uses Y as the SA. Then, valid ECU 100 starts transmitting a normal message that includes Y as the SA after a predetermined time has passed since the malicious ECU transmitted the claim message. Meanwhile, the malicious ECU starts transmitting a normal message that includes X as the SA after having transmitted the claim message that includes X as the SA.

In other words, a normal message that is transmitted by the malicious ECU and that includes, as the SA, X that valid ECU 100 was using originally and another normal message that is transmitted by valid ECU 100 and that includes Y as the changed SA flow in network 300. Even in a case where valid ECU 100 has had its SA to use changed, the identifier (PGN) included in a normal message transmitted by valid ECU 100 remains the same as before the change. In order to spoof a normal message transmitted by valid ECU 100, a normal message transmitted by the malicious ECU includes an identifier (PGN) identical to the identifier of the normal message transmitted by valid ECU 100.

Accordingly, information processing device 10 can detect a malicious message in network 300 if, of a plurality of normal messages received after a predetermined time has passed since information processing device 10 received a claim message, one of the normal messages includes an SA included in the claim message and another one of the normal messages includes an SA different from the SA included in the claim message and if the one of the normal messages and the other one of the normal messages include the same identifier.

The predetermined time may be defined based on the prescribed time (e.g., 250 ms), for example.

The fourth example leads to a network situation identical to that in the third example if the DN of valid ECU 100 and the DN of a malicious ECU are identical. In other words, the fourth example can be applied to the third example.

Advantageous Effects and Others

Information processing device 10 detects a malicious message in network 300 in which a plurality of ECUs 100 are connected. The plurality of ECUs 100 are each a device that transmits, to network 300, a claim message claiming an SA that the device desires to use in network 300 and then starts transmitting a normal message that includes this SA to network 300. Information processing device 10 includes malicious message detector 11 and outputter 12. Malicious message detector 11 detects a malicious message in network 300 based on an SA included in a claim message received from network 300, a period that is based on the time at which the claim message is received, and a message received from network 300 before or after the claim message. Outputter 12 outputs a detection result of malicious message detector 11.

When a claim message that includes a specific SA flows in network 300, in a normal operation, a message (e.g., a normal message or another claim message) that flows in network 300 before or after the claim message flows in network 300 follows a certain rule that is based on this specific SA and the period that is based on the time at which this claim message is received. Therefore, information processing device 10 can detect a malicious message in network 300 if information processing device 10 has received, from network 300, a message that deviates from the rule before or after information processing device 10 has received the claim message from network 300. In other words, no communication for authentication or key sharing is carried out in order to detect a malicious message. Thus, no delay associated with such communication occurs, no field for storing a MAC is required in a normal message, and an increase in the time it takes to transmit a normal message can be suppressed. This makes it possible to detect a malicious message in network 300 while keep the communication quality from deteriorating.

Malicious message detector 11 may detect a malicious message in network 300 based on an SA included in a claim message received from network 300 and a message received from network 300 in a predetermined period that is based on the time at which the claim message is received.

When a claim message that includes a specific SA flows in network 300, in a normal operation, a message that flows in network 300 in a predetermined period that is based on the time at which the claim message flows in network 300 follows a certain rule that is based on this specific SA. Therefore, information processing device 10 can detect a malicious message in network 300 if information processing device 10 has received, from network 300, a message that deviates from the rule in the predetermined period that is based on the time at which information processing device 10 has received the claim message from network 300.

Malicious message detector 11 may detect a malicious message in network 300 based on an SA included in a claim message received from network 300 and a normal message received from network 300 in a predetermined period that is based on the time at which the claim message is received.

When a claim message that includes a specific SA flows in network 300, in a normal operation, a normal message that flows in network 300 in a predetermined period that is based on the time at which the claim message flows in network 300 follows a certain rule that is based on this specific SA. Therefore, information processing device 10 can detect a malicious message in network 300 if information processing device 10 has received, from network 300, a normal message that deviates from the rule in the predetermined period that is based on the time at which information processing device 10 has received the claim message from network 300.

If an SA included in a normal message received from network 300 in a first period, serving as a predetermined period, that ends at the time at which a claim message is received is identical to an SA included in the claim message received at the stated time, malicious message detector 11 may determine that the claim message received at the stated time is a malicious message.

In a normal operation, the plurality of ECUs 100 each transmit a claim message only upon starting or restarting except when the plurality of ECUs 100 are each instructed by other ECUs 100 to transmit a claim message. In other words, the plurality of ECUs 100 each perform an initialization operation and so on at the time of starting or restarting and do not transmit a normal message that includes a specific SA in the first period that precedes when the plurality of ECUs 100 transmit a claim message that includes the specific SA. Therefore, in a normal operation, if information processing device 10 has received, from network 300, a claim message that includes a specific SA, information processing device 10 does not receive any normal message that includes the specific SA in the first period that precedes when information processing device 10 receives the claim message. To rephrase, in a normal operation, information processing device 10 does not receive a claim message that includes the specific SA in the first period that follows when information processing device 10 has received a normal message that includes the specific SA. Accordingly, if an SA included in a normal message received from network 300 in the first period, serving as a predetermined period, that ends at the time at which a claim message is received is identical to an SA included in the claim message received at the stated time, information processing device 10 can determine that the claim message received at the stated time is a malicious message.

Information processing device 10 may further include preventer 13. When the detection result of malicious message detector 11 indicates that the claim message received at the stated time is a malicious message, preventer 13 may transmit a signal that disables the claim message to network 300.

The plurality of ECUs 100 each operate so as to change the SA that each ECU 100 is using depending on the content of a claim message received from other ECUs 100. In other words, the plurality of ECUs 100 may be caused to change the SA that each ECU 100 is using by a malicious claim message. In this respect, information processing device 10 can keep the SA that ECU 100 is using from being changed by disabling a malicious claim message immediately upon detecting the malicious claim message that flows in network 300 (e.g., before ECU 100 finishes receiving the malicious claim message from network 300).

If an SA included in a normal message received from network 300 in a second period, serving as a predetermined period, that starts at the time at which a claim message is received is identical to an SA included in another claim message received at the stated time, malicious message detector 11 may determine that the claim message received at the stated time is a malicious message.

In a normal operation, the plurality of ECUs 100 each start transmitting a normal message that includes a specific SA after having waited to see whether each ECU 100 receives any response to the transmitted claim message from other ECUs 100 within a prescribed time (e.g., 250 ms) from the transmission of the claim message that includes the specific SA. In other words, the plurality of ECUs 100 each refrain from transmitting a normal message that includes the specific SA in the second period that follows when each ECU 100 has transmitted a claim message that includes the specific SA. Therefore, in a normal operation, if information processing device 10 has received, from network 300, a claim message that includes a specific SA, information processing device 10 does not receive any normal message that includes the specific SA in the second period that follows when information processing device 10 has received the claim message. Accordingly, if an SA included in a normal message received from network 300 in the second period, serving as a predetermined period, that starts at the time at which the claim message is received is identical to an SA included in the claim message received at the stated time, information processing device 10 can determine that the claim message received at the stated time is a malicious message.

Malicious message detector 11 may detect a malicious message in network 300 based on an SA included in a claim message received from network 300 and another claim message received from network 300 in a predetermined period that is based on the time at which the claim message is received.

When a claim message that includes a specific SA flows in network 300, in a normal operation, another claim message different from the claim message that flows in network 300 in a predetermined period that is based on the time at which the claim message flows in network 300 follows a certain rule that is based on the specific SA. Therefore, information processing device 10 can detect a malicious message in network 300 if information processing device 10 has received, from network 300, another claim message that deviates from the rule in the predetermined period that is based on the time at which information processing device 10 has received the claim message from network 300.

A claim message to be transmitted to network 300 by each of the plurality of ECUs 100 further includes a DN assigned in advance and unique to each of the plurality of ECUs 100. If a DN included in a claim message received from network 300 in a third period, serving as a predetermined period, that starts at the time at which a claim message is received is identical to a DN included in the claim message received at the stated time and if an SA included in the claim message received in the third period is different from an SA included in the claim message received at the stated time, malicious message detector 11 may determine that the claim message received at the stated time or the claim message received in the third period is a malicious message.

In a normal operation, after a claim message that includes a specific SA and a specific DN has flowed in network 300, a claim message that includes an SA different from the specific SA and the specific DN does not flow in network 300 in the third period. Therefore, in a normal operation, if information processing device 10 has received, from network 300, a claim message that includes a specific SA and a specific DN, information processing device 10 does not receive any claim message that includes an SA different from the specific SA and the DN in the third period that follows when information processing device 10 has received the claim message. Accordingly, if a DN included in a claim message (referred to as a second claim message) received from network 300 in the third period, serving as a predetermined period, that starts at the time at which information processing device 10 has received another claim message (referred to as a first claim message) is identical to a DN included in the first claim message and if an SA included in the second claim message is different from an SA included in the first claim message, information processing device 10 can determine that the first claim message or the second claim message is a malicious message.

Malicious message detector 11 may detect a malicious message in network 300 based on an SA included in a claim message received from network 300 and a plurality of normal messages received from network 300 after a predetermined time has passed since the time at which the claim message was received.

When a claim message that includes a specific SA flows in network 300, in a normal operation, a plurality of normal messages that flow in network 300 after a predetermined time has passed since the time at which the claim message flowed in network 300 follow a certain rule that is based on the specific SA. Therefore, information processing device 10 can detect a malicious message in network 300 if information processing device 10 has received, from network 300, a normal message that deviates from the rule after the predetermined time has passed since the time at which information processing device 10 received the claim message from network 300.

A normal message to be transmitted to network 300 by each of the plurality of ECUs 100 further includes an identifier that uniquely determines the format of the normal message. Malicious message detector 11 may detect a malicious message in network 300 if, of a plurality of normal messages received after a predetermined time has passed, one of the normal messages includes an SA included in the claim message received at the stated time and another one of the normal messages includes an SA different from the SA included in the claim message received at the stated time and if the one of the normal messages and the other one of the normal messages include the same identifier.

The plurality of ECUs 100 each operate so as to change the SA that each ECU 100 is using depending on the content of a claim message received from other ECUs 100. In other words, the plurality of ECUs 100 may be caused to change the SA that each ECU 100 is using by a malicious claim message. Therefore, when network 300 is attacked, a normal message that is a malicious normal message and that includes X as the SA that valid ECU 100 has been using originally and another normal message that is transmitted by valid ECU 100 and that includes the changed SA flow in network 300. Even in a case where valid ECU 100 has had its SA to use changed, the identifier included in a normal message transmitted by valid ECU 100 remains the same as before the change. In order to spoof a normal message transmitted by valid ECU 100, a normal message transmitted by a malicious ECU includes an identifier identical to the identifier in the normal message transmitted by valid ECU 100. Accordingly, information processing device 10 can detect a malicious message in network 300 if, of a plurality of normal messages received after a predetermined time has passed, one of the normal messages includes the SA included in the claim message and another one of the normal messages includes an SA different from the SA included in the claim message and if the one of the normal messages and the other one of the normal messages include the same identifier.

The plurality of ECUs 100 may each start transmitting, to network 300, a normal message including an SA that each ECU 100 desires to use in network 300 if each ECU 100 receives no response to a transmitted claim message from other ECUs 100 within a prescribed time from the transmission of the claim message.

In this manner, each ECU 100 can transmit, to network 300, a normal message using the desired SA thereafter if each ECU 100 receives no response to the transmitted claim message from other ECUs 100.

Network 300 may a CAN that is based on the SAE J1939 standard, and a claim message may be an ACL message defined in the SAE J1939 standard.

In this manner, the present disclosure can be applied to a CAN that is based on the SAE J1939 standard.

Information processing system 1 includes information processing device 10, a plurality of ECUs 100, and network 300.

This makes it possible to provide information processing system 1 that can detect a malicious message in network 300 while keeping the communication quality from deteriorating.

Other Embodiments

Thus far, some embodiments have been described to illustrate the techniques according to the present disclosure. However, the techniques according to the present disclosure are not limited to the foregoing embodiments and can also be applied to other embodiments that include modifications, substitutions, additions, omissions, and so on, as appropriate. For example, the following variations are also encompassed by an embodiment of the present disclosure.

For example, in the embodiments described above, information processing device 10 includes preventer 13, but information processing device 10 does not need to include preventer 13.

For example, in the embodiments described above, information processing system 1 includes ECUs 100a to 100e, but it suffices that information processing system 1 include at least two ECUs 100.

The present disclosure can be implemented not only in the form of information processing device 10 and information processing system 1 but also in the form of an information processing method that includes steps (processes) performed by the components constituting information processing device 10.

For example, the steps in the information processing method may be executed by a computer (computer system). Then, the present disclosure can be implemented in the form of a program that causes the computer to execute the steps included in the information processing method.

This program is to be executed by information processing device 10 that detects a malicious message in network 300 in which a plurality of ECUs 100 are connected. The plurality of ECUs 100 are each a device that transmits, to network 300, a claim message claiming an SA that the device desires to use in network 300 and then starts transmitting a normal message that includes this SA to network 300. As illustrated in FIG. 8, the program includes a malicious message detecting process (step S111) of detecting a malicious message in network 300 based on an SA included in a claim message received from network 300, a period that is based on the time at which the claim message is received, and a message received from network 300 before or after the claim message. The program also includes an outputting process (step S112) of outputting the detection result.

Furthermore, the present disclosure can be implemented in the form of a non-transitory computer-readable recording medium, such as a CD-ROM, that stores the above program.

For example, in a case where the present disclosure is implemented in the form of a program (software), each step is executed as the program is executed with the use of hardware resources, such as a CPU, a memory, and an input and output circuit, of a computer. In other words, each step is executed as the CPU acquires data from the memory, the input and output circuit, or the like and performs an arithmetic operation on the data or as the CPU outputs the arithmetic operation result to the memory, the input and output circuit, or the like.

Each component included in information processing device 10 according to the foregoing embodiments may be implemented in the form of a dedicated or general-purpose circuit.

Each component included in information processing device 10 according to the foregoing embodiments may be implemented in the form of a large-scale integration (LSI), which is an integrated circuit (IC).

The integrated circuit is not limited to an LSI and may be implemented by a dedicated circuit or a general-purpose processor. A field-programmable gate array (FPGA) that can be programmed or a reconfigurable processor that can have circuit cell connections and configurations within the LSI reconfigured may be used.

Furthermore, when a circuit integration technique that replaces LSI appears through the advancement in the semiconductor technology or through derived different technology, each component included in information processing device 10 may be integrated into a circuit through that circuit integration technique.

An embodiment obtained by making various modifications that a person skilled in the art can conceive of to the foregoing embodiments and an embodiment achieved by combining, as desired, the components and the functions of the foregoing embodiments within the scope that does not depart from the spirit of the present disclosure are also encompassed by the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosure of the following Japanese Patent Application including specification, drawings and claims are incorporated herein by reference in its entirety: 2019-152453 filed on Aug. 23, 2019.

INDUSTRIAL APPLICABILITY

The present disclosure can be applied to a device for handling a malicious message that flows in a network in a truck, a bus, a construction machine, a tractor, a trailer, a ship, or the like, for example.

What is claimed is:

1. An information processing device that detects a malicious message in a network in which a plurality of electronic control units are connected, the plurality of electronic control units each being a device that transmits, to the network, a claim message claiming a source address that the device desires to use in the network and then starts transmitting a normal message that includes the source address to the network, the information processing device comprising:
    a memory that stores instructions; and
    a processor, when executing the instructions stored in the memory, that performs operations including:
    detecting a malicious message in the network based on (i) a source address included in a claim message received from the network, (ii) a period that is based on a time at which the claim message is received, and (iii) a message received from the network before or after the claim message; and
    outputting a detection result of detecting the malicious message, wherein
    the processor detects, in the detecting, the malicious message in the network based on the source address included in the claim message received from the network and a message received from the network in a predetermined period that is based on the time at which the claim message is received,
    the processor detects, in the detecting, the malicious message in the network based on the source address included in the claim message received from the network and a claim message received from the network in the predetermined period that is based on the time at which the claim message is received,
    a claim message transmitted to the network from each of the plurality of electronic control units further includes a device name assigned in advance and unique to each of the plurality of electronic control units, and
    when a device name included in a claim message received from the network in a third period, serving as the predetermined period, that starts at the time is identical to a device name included in another claim message received at the time and when a source address included in the claim message received in the third period is different from a source address included in the other claim message received at the time, the processor determines, in the detecting, that one of the other claim message received at the time and the claim message received in the third period is a malicious message.

2. The information processing device according to claim 1, wherein
    the processor detects the malicious message in the network based on the source address included in the claim message received from the network and a normal message received from the network in the predetermined period that is based on the time at which the claim message is received.

3. The information processing device according to claim 2, wherein
    the processor determines that the claim message received at the time is a malicious message when a source address included in a normal message received from the network in a first period, serving as the predetermined period, that ends at the time is identical to the source address included in the claim message received at the time.

4. The information processing device according to claim 3, wherein the processor, when executing the instructions, further performs operations including:
    when the detection result indicates that the claim message received at the time is the malicious message, transmits transmitting, to the network, a signal that disables the claim message.

5. The information processing device according to claim 3, wherein
    the processor determines that the claim message received at the time is a malicious message when a source address included in a normal message received from the network in a second period, serving as the predetermined period, that starts at the time is identical to the source address included in the claim message received at the time.

6. The information processing device according to claim 1, wherein
    the processor detects the malicious message in the network based on the source address included in the claim message received from the network and a plurality of normal messages received from the network after a predetermined time has passed from the time at which the claim message is received.

7. The information processing device according to claim 6, wherein
    a normal message transmitted to the network from each of the plurality of electronic control units further includes an identifier that uniquely determines a format of the normal message, and
    the processor detects the malicious message in the network when, of the plurality of normal messages received after the predetermined time has passed, one of the plurality of normal messages includes the source address included in the claim message received at the time and another one of the plurality of normal messages includes a source address different from the source address included in the claim message received at the time and when the identifier included in the one of the plurality of normal messages and the identifier included in the other one of the plurality of normal messages are identical to each other.

8. The information processing device according to claim 1, wherein
    each of the plurality of electronic control units starts transmitting, to the network, the normal message that includes the source address that each of the plurality of electronic control units desires to use in the network when no response to the claim message transmitted is received from other one or more of the plurality of electronic control units within a prescribed time from transmission of the claim message.

9. The information processing device according to claim 1, wherein
the network is a controller area network (CAN) that is based on a Society of Automotive Engineers (SAE) J1939 standard, and
the claim message is an address claim message defined in the SAE J1939 standard.

10. An information processing system, comprising:
a plurality of electronic control units connected to a network, each of the plurality of electronic control units being a device including a processor that transmits, to the network, a claim message claiming a source address that the device desires to use in the network and then starts transmitting a normal message that includes the source address to the network; and
an information processing device including:
a memory that stores instructions; and
a processor, when executing the instructions stored in the memory, that performs operations including:
detecting a malicious message in the network based on (i) a source address included in a claim message received from the network, (ii) a period that is based on a time at which the claim message is received, and (iii) a message received from the network before or after the claim message; and
outputting a detection result of detecting the malicious message, wherein
the processor detects, in the detecting, the malicious message in the network based on the source address included in the claim message received from the network and a message received from the network in a predetermined period that is based on the time at which the claim message is received,
the processor detects, in the detecting, the malicious message in the network based on the source address included in the claim message received from the network and a claim message received from the network in the predetermined period that is based on the time at which the claim message is received,
a claim message transmitted to the network from each of the plurality of electronic control units further includes a device name assigned in advance and unique to each of the plurality of electronic control units, and
when a device name included in a claim message received from the network in a third period, serving as the predetermined period, that starts at the time is identical to a device name included in another claim message received at the time and when a source address included in the claim message received in the third period is different from a source address included in the other claim message received at the time, the processor determines in the detecting that one of the other claim message received at the time and the claim message received in the third period is a malicious message.

11. A non-transitory computer-readable recording medium having a program recorded thereon, the program being to be executed by an information processing device that detects a malicious message in a network in which a plurality of electronic control units are connected, the plurality of electronic control units each being a device that transmits, to the network, a claim message claiming a source address that the device desires to use in the network and then starts transmitting a normal message that includes the source address to the network, the program comprising:
detecting a malicious message in the network based on a source address included in a claim message received from the network, a period that is based on a time at which the claim message is received, and a message received from the network before or after the claim message; and
outputting a result of the detecting, wherein
the malicious message in the network is detected in the detecting, based on the source address included in the claim message received from the network and a message received from the network in a predetermined period that is based on the time at which the claim message is received,
the malicious message in the network is detected in the detecting, based on the source address included in the claim message received from the network and a claim message received from the network in the predetermined period that is based on the time at which the claim message is received,
a claim message transmitted to the network from each of the plurality of electronic control units further includes a device name assigned in advance and unique to each of the plurality of electronic control units, and
when a device name included in a claim message received from the network in a third period, serving as the predetermined period, that starts at the time is identical to a device name included in another claim message received at the time and when a source address included in the claim message received in the third period is different from a source address included in the other claim message received at the time, it is determined in the detecting that one of the other claim message received at the time and the claim message received in the third period is a malicious message.

12. An information processing device that detects a malicious message in a network in which a plurality of electronic control units are connected, the plurality of electronic control units each being a device that transmits, to the network, a claim message claiming a source address that the device desires to use in the network and then starts transmitting a normal message that includes the source address to the network, the information processing device comprising:
a memory that stores instructions; and
a processor, when executing the instructions stored in the memory, that performs operations including:
detecting a malicious message in the network based on (i) a source address included in a claim message received from the network, (ii) a period that is based on a time at which the claim message is received, and (iii) a message received from the network before or after the claim message; and
outputting a detection result of detecting the malicious message, wherein
the processor detects, in the detecting, the malicious message in the network based on the source address included in the claim message received from the network and a plurality of normal messages received from the network after a predetermined time has passed from the time at which the claim message is received,
a normal message transmitted to the network from each of the plurality of electronic control units further includes an identifier that uniquely determines a format of the normal message, and
the processor detects, in the detecting, the malicious message in the network when, of the plurality of normal messages received after the predetermined time has passed, one of the plurality of normal messages includes the source address included in the claim message received at the time and another one of the plurality of normal messages includes a source address different from the source address included in the claim message received at the time and when the identifier included in the one of the plurality of normal messages and the identifier included in the other one of the plurality of normal messages are identical to each other.

13. A non-transitory computer-readable recording medium having a program recorded thereon, the program being to be executed by an information processing device that detects a malicious message in a network in which a plurality of electronic control units are connected, the plurality of electronic control units each being a device that transmits, to the network, a claim message claiming a source address that the device desires to use in the network and then starts transmitting a normal message that includes the source address to the network, the program comprising:

detecting a malicious message in the network based on a source address included in a claim message received from the network, a period that is based on a time at which the claim message is received, and a message received from the network before or after the claim message; and outputting a result of the detecting, wherein the malicious message in the network is detected in the detecting, based on the source address included in the claim message received from the network and a plurality of normal messages received from the network after a predetermined time has passed from the time at which the claim message is received, a normal message transmitted to the network from each of the plurality of electronic control units further includes an identifier that uniquely determines a format of the normal message, and the malicious message in the network is detected in the detecting when, of the plurality of normal messages received after the predetermined time has passed, one of the plurality of normal messages includes the source address included in the claim message received at the time and another one of the plurality of normal messages includes a source address different from the source address included in the claim message received at the time and when the identifier included in the one of the plurality of normal messages and the identifier included in the other one of the plurality of normal messages are identical to each other.

* * * * *